US012620786B2

(12) United States Patent
Westphal et al.

(10) Patent No.: US 12,620,786 B2
(45) Date of Patent: May 5, 2026

(54) REDUNDANT RELAY SYSTEMS AND RELATED METHODS FOR USE WITH SWITCHGEAR

(71) Applicant: G & W Electric Company, Bolingbrook, IL (US)

(72) Inventors: Robert J. Westphal, Chicago, IL (US); Blair S. Kerr, Downers Grove, IL (US); Jason M. Knott, Plainfield, IL (US)

(73) Assignee: G & W Electric Company, Bolingbrook, IL (US)

( * ) Notice: Subject to any disclaimer, the term of this patent is extended or adjusted under 35 U.S.C. 154(b) by 335 days.

(21) Appl. No.: 18/354,463

(22) Filed: Jul. 18, 2023

(65) Prior Publication Data

US 2025/0030226 A1     Jan. 23, 2025

(51) Int. Cl.
H02B 1/24          (2006.01)
H02B 13/00         (2006.01)
(52) U.S. Cl.
CPC ............... H02B 1/24 (2013.01); H02B 13/00 (2013.01)
(58) Field of Classification Search
CPC .................................. H02B 1/24; H02B 13/00
USPC .......................................................... 361/190
See application file for complete search history.

(56) References Cited

U.S. PATENT DOCUMENTS

| | | | | |
|---|---|---|---|---|
| 5,912,604 A | * | 6/1999 | Harvey .............. | H01H 33/6662 |
| | | | | 218/138 |
| 6,362,445 B1 | * | 3/2002 | Marchand .......... | H02B 13/0354 |
| | | | | 218/155 |
| 6,687,573 B2 | | 2/2004 | Egolf et al. | |
| 8,526,156 B2 | | 9/2013 | Schweitzer, III et al. | |
| 9,006,925 B2 | | 4/2015 | Black et al. | |
| 11,218,023 B2 | | 1/2022 | Manson et al. | |
| 2004/0105204 A1 | | 6/2004 | Jeffrey, Sr. et al. | |
| 2007/0252667 A1 | * | 11/2007 | Zhou ...................... | H01H 3/227 |
| | | | | 335/16 |
| 2018/0261416 A1 | * | 9/2018 | Reuber ................. | H01H 71/10 |

(Continued)

OTHER PUBLICATIONS

Development and Performance Evaluation of an Intelligent Electric Power Switching System Popoola A. I, Akinpelu E. O, Ewetumo T, International Journal of Trend in Scientific Research and Development (IJTSRD), vol. 5 Issue 3, Mar.-Apr. 2021 (Year: 2021).*

*Primary Examiner* — Sreeya Sreevatsa
(74) *Attorney, Agent, or Firm* — Michael Best & Friedrich LLP

(57)          ABSTRACT

Methods and systems for redundant relay systems for use with switchgears. One example system includes a switch module including a switching device therein, a coil circuit operatively coupled to the switch module to control a position of the switching device, a switchgear relay circuit, and a back-up trip circuit. The back-up trip circuit includes a polarity control device, a changeover device, and an electronic processor. The electronic processor is configured to monitor for a loss of power to the switchgear relay circuit or for a switchgear relay failure, and in response to detecting either of the loss of power or the switchgear relay failure, operate the switch module by actuating the changeover device to disconnect the coil circuit from the switchgear relay circuit and connect the coil circuit to the polarity control device of the back-up trip circuit.

20 Claims, 7 Drawing Sheets

(56)         References Cited

U.S. PATENT DOCUMENTS

2022/0131366 A1      4/2022  Schweitzer, III et al.
2022/0140644 A1*    5/2022  Dent ........................ H02J 3/38
                                                        307/77

* cited by examiner

REDUNDANT RELAY SYSTEMS AND RELATED METHODS FOR USE WITH SWITCHGEAR

BACKGROUND OF THE INVENTION

Distributed energy resources (DERs) refer to renewable energy generation units/systems (for example, solar arrays, wind turbines, etc.) located on a consumer side (a business or a home) of an electrical power distribution system (e.g., an electrical grid) to provide a business or home with power. DERs are also referred to as "behind the meter" because the electricity of such systems is generated and managed "behind" the electricity meter in the consumer facility.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features of concepts that include the claimed subject matter and explain various principles and advantages of those embodiments, examples, aspects, and features.

Figure 1A:
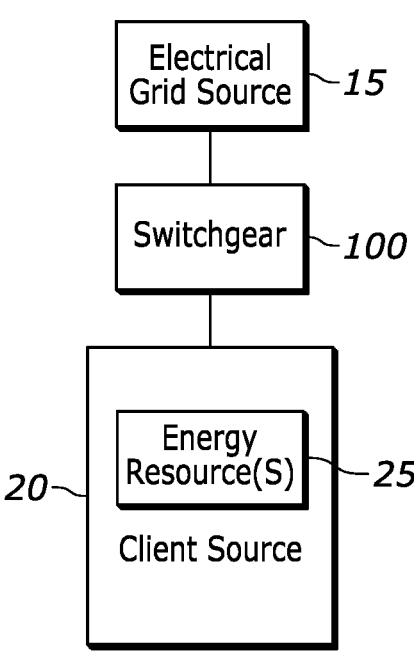
FIG. 1A is a simplified diagram of an electrical power distribution system in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various examples.

The apparatus and method components have been represented where appropriate by conventional symbols in the drawings, showing only those specific details that are pertinent to understanding the embodiments, examples, aspects, and features so as not to obscure the disclosure with details that will be readily apparent to those of ordinary skill in the art having the benefit of the description herein.

DETAILED DESCRIPTION OF THE INVENTION

Electrical power distribution systems include fault monitoring equipment that identifies problems in the system and opens isolation devices to isolate the problems. Example problems with the electrical power distribution systems include overcurrent faults, phase-to-phase faults, ground faults, and others. These problems may arise from various causes, such as equipment failure, weather-related damage to equipment, etc. Switching equipment (for example, recloser relay systems) is provided in electrical power distribution system to isolate the detected faults.

As noted above, DERs interconnected to electrical grids may be utilized by consumers at a home or at a business. Such systems may be required to comply with certain professional industry standards (for example, those issued by the Institute of Electrical and Electronics Engineers (IEEE)). Some such standards may include what actions are to be performed with respect to a DER in case of certain faults or other events within the system. For example, IEEE 1547 requires that isolation devices of DER interconnections operate (trip) in the event of a loss of power/potential in the grid, thereby disconnecting the DER from the electrical grid. While some DER systems may utilize one or more recloser relay circuits to disconnect the DERs, such recloser relay circuits may fail to operate in certain instances (for example, due to a software and/or hardware failure or a loss of power ("LOP") to the recloser relay circuit itself). In such instances, there is no ability to meet the IEEE 1547 requirement.

These and other related problems in the field can be beneficially addressed using at least some embodiments, examples, aspects, and features disclosed herein. Various examples provide, among other things, a back-up redundant relay system that monitors for certain electrical events associated with the recloser relay circuit (e.g., a failure of the recloser relay circuit to operate) when a DER interconnection is required to be tripped and performs one or more actions to disconnect and isolate the DER from an electrical grid source absent functioning the recloser relay circuit. In some instances, the back-up redundant relay system disclosed herein is provided with a trip circuit, separate from the recloser relay circuit, that can be advantageously utilized in a switchgear system to provide redundant control functionality to the switchgear with respect to the tripping operation. This redundancy helps improves safety and reliability of the switchgear.

One example provides a switchgear system including a switch module including a switching device therein, a coil circuit operatively coupled to the switch module to control a position of the switching device, a switchgear relay circuit, and a back-up trip circuit. The back-up trip circuit includes a polarity control device, a changeover device, and an electronic processor. The electronic processor is configured to monitor for a loss of power to the switchgear relay circuit or for a switchgear relay failure, and in response to detecting either of the loss of power or the switchgear relay failure, operate the switch module by actuating the changeover device to disconnect the coil circuit from the switchgear relay circuit and connect the coil circuit to the polarity control device of the back-up trip circuit.

Another example provides a back-up trip circuit for a switchgear relay circuit of a switchgear system. The circuit includes a polarity control device, a changeover device, and an electronic processor. The electronic processor is configured to monitor for a loss of power to the switchgear relay circuit or for a switchgear relay failure, and in response to detecting either of the loss of power or the switchgear relay failure, operate a switch module by actuating the changeover device to disconnect a coil circuit operatively coupled to the switch module to control a position of a switching device therein from the switchgear relay circuit and connect the coil circuit to the polarity control device of the back-up trip circuit.

Another example provides a method for operating a back-up trip circuit for a switchgear relay circuit of a switchgear system, the back-up trip circuit including a polarity control device and a changeover device. The method includes monitoring for a loss of power to the switchgear relay circuit or for a switchgear relay failure, and in response to detecting either of the loss of power or the switchgear relay failure, operating a switch module by actuating the changeover device to disconnect a coil circuit operatively coupled to the switch module to control a position of a switching device therein from the switchgear relay circuit and connect the coil circuit to the polarity control device of the back-up trip circuit.

Yet another example provides a non-transitory, computer-readable medium, comprising commands which, when executed by a computer, cause the computer to control a back-up trip circuit for a switchgear relay circuit of a switchgear system, the back-up trip circuit including a polarity control device and a changeover device, by monitoring for a loss of power to the switchgear relay circuit or for a switchgear relay failure, and in response to detecting either of the loss of power or the switchgear relay failure, operating a switch module by actuating the changeover device to disconnect a coil circuit operatively coupled to the switch module to control a position of a switching device therein from the switchgear relay circuit and connect the coil circuit to the polarity control device of the back-up trip circuit.

For ease of description, some or all of the examples, aspects, and features presented herein are illustrated with a single exemplar of each of its component parts. Some examples may not describe or illustrate all components of the systems. Other examples may include more or fewer of each of the illustrated components, may combine some components, or may include additional or alternative components. It should also be understood that although the examples described herein are in terms of being utilized for DER interconnections, it should be understood that the systems and methods described herein may be applied to other configurations of electrical power distribution system interconnections.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed.

FIG. 1A is a simplified diagram of an electrical power distribution system 10 in accordance with some examples. In the example illustrated, the electrical power distribution system 10 includes an electrical grid source 15 and a client source 20 (for example, a DER system). The electrical power distribution system 10 further includes a switchgear system 100 disposed between the electrical grid source 15 and the client source 20. As explained in more detail below, the switchgear system 100 is configured to disconnect (e.g., temporarily disconnect) the client source 20 from the electrical power distribution system 10 (and any other devices upstream of the switchgear system 100), for example, in instances of a fault such as LOP faults, overcurrent faults, phase-to-phase faults, ground faults, etc. To facilitate breaking, interrupting, and/or, more generally, terminating a flow of electric current between the grid source 15 and the client source 20, the switchgear system 100 is provided with one or more switchgear (for example, the switchgear 120 illustrated in FIG. 1C) electrically connected to the grid source 15 and the client source 20.

In some examples, the switchgear system 100 forms and/or defines at least part of a DER system. In such examples, the client source 20 of FIG. 1A can be provided with one or more energy resources 25 electrically connected to the switchgear system 100, for example, directly to the switchgear and/or via one or more intermediate elements (e.g., a breaker) of the DER system interposed between the switchgear and the resource(s) 25. In the illustrated example of FIG. 1A, the energy resource(s) 25 include any of, for example, one or more photovoltaic (PV) panels (e.g., a PV array), one or more wind turbines, one or more batteries, and the like, or a combination thereof.

Figure 1B:
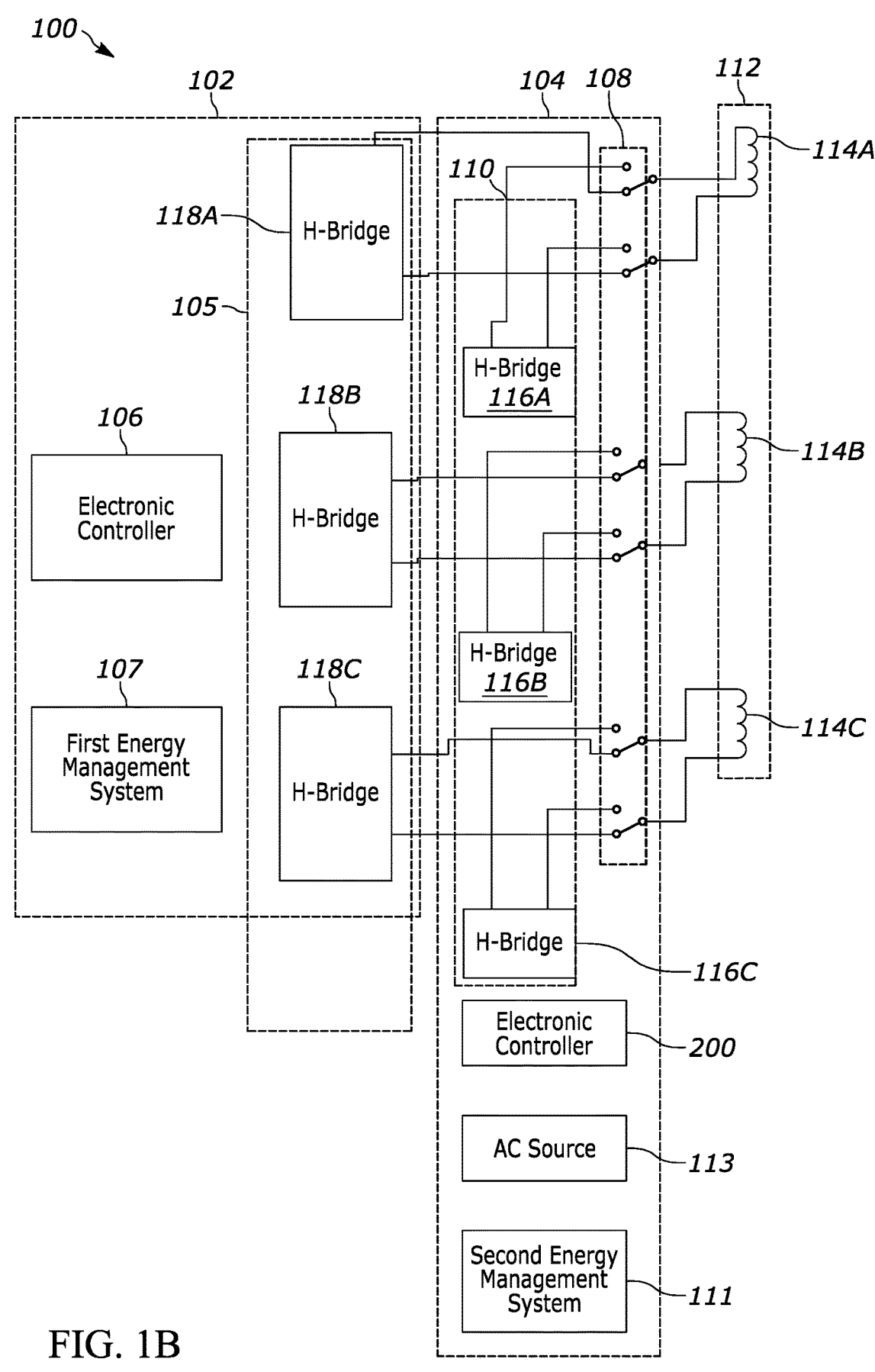
FIG. 1B is a diagram of a switchgear system for the electrical power distribution system of FIG. 1A in accordance with some aspects.

FIG. 1B is a block diagram of the switchgear system 100 for the electrical power distribution system 10 in accordance with some examples. In this example, to facilitate operating the switchgear, the system 100 includes a switchgear relay circuit 102 and a back-up trip circuit 104 separate from and/or external to the switchgear relay circuit 102. The switchgear relay circuit 102 includes a trip circuit 105, a first electronic controller 106, and a first energy management system 107. The trip circuit 105 of the switchgear relay circuit 102 is sometimes referred to as a primary trip circuit, while the back-up trip circuit 104 is sometimes referred to as a secondary or redundant trip circuit. The back-up trip circuit 104 includes a changeover device 108 (for example, a Form C circuit or similar circuit), a polarity control device 110 (for example, an h-bridge circuit or a similar circuit), and a second electronic controller 200 (which is illustrated and described in more detail below in regard to FIG. 2). Additionally, in some examples, to allow for independent power functions, the back-up trip circuit 104 is provided with a second energy management system 111 distinct from the first energy management system 107 of the switchgear relay circuit 102. The back-up trip circuit 104 is operationally interposed between the switchgear relay circuit 102 and a coil circuit 112 of the switchgear system 100.

To help facilitate efficient and reliable circuit operation, the first energy management system 107 is provided with one or more devices configured to perform power-related functions within the switchgear relay circuit 102. For example, the first energy management system 107 may include a first power supply (not shown) configured to convert electrical power (e.g., from an alternating current (AC) to a direct current (DC) for use by the switchgear relay circuit 102 and, in some examples, for use by the back-up trip circuit 104. Additionally or alternatively, the first power supply regulates and/or filters voltage to ensure stable and/or clean power is supplied to the circuit 102. Additionally, in some examples, the first energy management system 107 is provided with a first energy storage device (for example, one or more capacitors), which is not shown, configured to store electrical energy (for example, energy supplied by the first power supply). Such stored electrical energy may be released by one of the (a) trip circuit 105 or (b) the back-up trip circuit 104 in an advantageous and/or controlled manner to drive switchgear operation.

Additionally or alternatively, in some examples, the back-up trip circuit 104 includes the second energy management system 111. The second energy management system 111 may be configured the same or similar relative to the first energy management system 107. In one example, the second energy management system 111 includes similar components and performs at least some or all of the functions of the first energy management system 107. Accordingly, the second energy management system 111 may serve as a redundant system capable of suitably powering the back-up trip circuit 104, or at least part thereof, to enable switchgear operation (for example, if the first energy management system 107 malfunctions or ceases to provide electrical power to the back-up trip circuit 104). In some examples, the second energy management system 111 or a device thereof (e.g., a second power supply) receives electrical power from an alternating current (AC) source 113 that is external to the switchgear relay circuit 102, which creates additional redundancy in the system.

In some examples, the switchgear relay circuit 102 can be implemented using an advanced recloser control. In such examples, as explained in more detail below, the switchgear relay circuit 102 can function as a recloser (also known as an autorecloser) by interacting with one or more current and/or voltage sensors associated with the switchgear 100 (shown and described in more detail below in regard to FIG. 2) and protection relays (not shown) configured to open ("trip") the interconnection between the sources 15 and 20. As also explained in more detail below, the back-up trip circuit 104 is configured to monitor for certain electrical events during which action is to be taken and/or for conditions of the switchgear relay circuit 102 indicative of such events. In one example, the back-up trip circuit 104 monitors for a LOP of the switchgear relay circuit 102 and/or for a failure of the switchgear relay circuit 102.

In monitoring for a LOP, the electronic controller 200 may utilize readings from one or more voltage or current sensors (sensors 235 of FIG. 2) or a suitable monitoring circuit (not shown) within or outside of the switchgear relay circuit 102 to detect instances where the switchgear relay circuit 102 no longer receives power from the respective first energy management system 107 or otherwise is unable to function properly. The back-up trip circuit 104 or at least a component thereof is configured to change state when an LOP is detected, thereby changing electrical connections between the coil circuit 112, the switchgear relay circuit 102, and the back-up trip circuit 104. For example, in response to the electronic controller 200 transmitting one or more signal(s) and/or command(s) to the changeover device 108, the back-up trip circuit 104 changes from a first circuit state providing primary electrical pathways in the switchgear system 100 to a second circuit state providing one or more different or secondary electrical pathways in the switchgear system 100.

In some examples, when in the first circuit state, the changeover device 108 forms, defines, and/or maintains a first electrical connection between the coil circuit 112 and the switchgear relay circuit 102, while keeping the coil circuit 112 electrically disconnected from the polarity control device 110. In this manner, the switchgear relay circuit 102 is enabled to control the coil circuit 112 to operate the associated switchgear. On the other hand, when in the second circuit state, the changeover device 108 forms, defines, and/or maintains a second electrical connection between the coil circuit 112 and the polarity control device 110, while electrically disconnecting the coil circuit 112 from the switchgear relay circuit 102 and/or keeping the coil circuit 112 electrically disconnected therefrom. In this manner, the polarity control device 110 is enabled to control the coil circuit 112 to operate the associated switchgear (instead of the switchgear relay circuit 102), and the switchgear relay circuit 102 is disabled or prevented from controlling the coil circuit 112. Such a circuit state change allows for transfer of control of the coil circuit 112 from the switchgear relay circuit 102 to the back-up trip circuit 104.

Each coil of the coil circuit 112 is associated with a respective electrical phase of the electrical power distribution system 10. In the illustrated example, the system 100 is configured for a three-phase system and, thus, the coil circuit 112 includes three actuator coils 114A-114C. In some examples, each coil 114A-114C of the coil circuit 112 is a single magnetic actuator coil. In other examples, each coil 114A-114C is implemented differently, for example, using a solenoid coil. Further, the polarity control device 110 comprises one or more devices for controlling circuit polarity, each corresponding to a respective phase (and coil thereof). The polarity control device 110 may include, for example, one or more h-bridges or h-bridge circuitry, one or more transistor arrays, other suitable circuitry or electronics operable to adjust, change, and/or maintain circuit polarity, or some combination thereof. In the illustrated example, the polarity control device 110 includes three h-bridges 116A-116C each, as explained in more detail below, corresponding to a respective coil 114A-114C of the coil circuit 112. In some examples, the trip circuit 105 may be configured similar to that of the polarity control device 110. For example, in the illustrated example, the trip circuit 105 also includes three h-bridges 118A-118C, each corresponding to a respective coil 114A-114C of the coil circuit 112. In alternative embodiments, the main trip circuit 105 and/or the back-up trip circuit 104 is/are a different configuration than the h-bridge circuitry illustrated in FIG. 1B. It should be understood that, although the switchgear system 100 is illustrated as being for a three-phase electric power distribution system (for example, the electrical power distribution system 10), the system 100 may be configured for any number phase electric power distribution system.

Communications between the first and second electronic controllers 106, 200, in the illustrated example, are performed via one or more communication networks or links, including various wired and wireless networks and links (for example, a wide area network (such as, for example, the Internet), a local area network (such as, for example, a Wi-Fi network), a short-range wireless network or connection (for example, a Bluetooth network), or a combination of the same). In some embodiments, either or both of the electronic controllers 106, 200 are configured to communicate with additional external systems, networks, or devices (for example, a separate electronic communications device such as a smart phone, a computer, etc.) using different respective communication links, which are not shown.

Figure 1C:
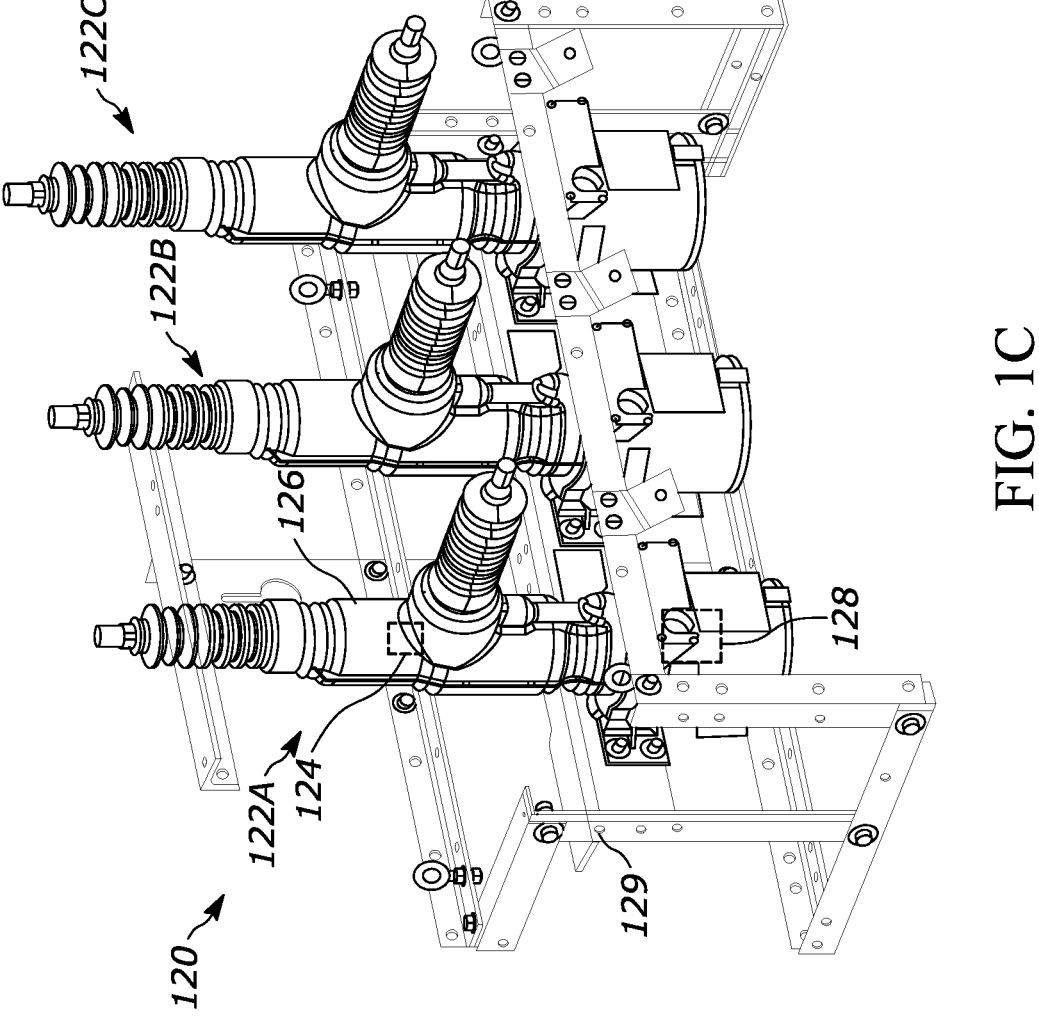
FIG. 1C is a switchgear for the switchgear system of FIG. 1B in accordance with some aspects.

FIG. 1C is a view of example switchgear 120 for the system 100 in accordance with some aspects. The switchgear 120 of FIG. 1C can be used to the implement at least part of the switchgear system 100 previously described. In some examples, the switchgear 120 is a medium or high voltage solid-dielectric recloser having one or more electrical phases. In other examples, the switchgear 120 is a solid-dielectric fault interrupting switch having one or more electrical phases. Tripping operation of the switchgear 120 can be driven by means of actuator output and/or, in some instances, mechanical energy (e.g., spring energy) stored via one or more mechanisms of the switchgear 120. In particular, the switchgear 120 is configured to electrically connect to part of the client source 20 (e.g., the energy resource(s) 25) and the electrical grid source 15, for example, via one or more cables, cable accessories, and the like, or a combination thereof.

According to the illustrated example of FIG. 1C, the switchgear 120 includes one or more modules (e.g., solid-dielectric switch modules), three of which are shown (i.e., a first module 122A, a second module 122B, and a third module 122C). Each module 122A-122C of the switchgear 120 is sometimes referred to as a switch module and can be implemented, for example, using at least a switching device (e.g., a vacuum bottle interrupter) and a body (e.g., a cured epoxy resin mixture) forming a protective and/or insulated housing around the switching device. Additionally, each module 122A-122C can be provided with electrical terminals (e.g., any of IEEE compliant bushing interfaces, aerial lugs, bushing insulators, etc.) to facilitate creating electrical connections from cabling external to the switchgear 120 to a switching device internal to the module. In normal operation, the modules 122A-122C can be independently operated or operated together (e.g., in a substantially synchronized manner).

For brevity, FIG. 1C and the accompanying description below depict aspects in connection with a single switch module 122A of the switchgear 120. However, in some examples, at least some or all such aspects likewise apply to one or more (e.g., all) other switch module(s) 122B-122C of the switchgear 120. In the illustrated example of FIG. 1C, the first module 122A includes a switching device 124 (represented by the dotted/dashed lines of FIG. 1C) and a housing 126 in which the switching device 124A is disposed. The switching device 124 of FIG. 1C can include a first portion (e.g., a fixed electrical contact) and a second portion (e.g., a movable electrical contact) movable relative to the first portion. In some examples, the switching device 124 is molded into the housing 126, for example, using one or more molding methods and/or techniques associated with curing epoxy resin mixtures.

To facilitate rapid switching operation, the first module 122A and/or, more generally, the switchgear 120 includes an actuator 128 (represented by dotted/dashed lines of FIG. 1C) operatively coupled to the switching device 124. The actuator 128 can be disposed in or adjacent the housing 126 proximate to the switching device 124. In one example, the actuator 128 of FIG. 1C is configured to apply an actuator output to the switching device 124, for example, via one or more intermediate linkages (e.g., a drive rod assembly) in the housing 126 connecting the actuator 128 to the switching device 124. Such intermediate linkage(s) in the first switch module 122A is/are structured to transfer output from a component of the actuator 128 to a component of the switching device 124.

The actuator 128 of FIG. 1C can be implemented, for example, using a single coil magnetic actuator. In the illustrated example of FIG. 1C, the actuator 128 includes an actuator coil to control a position of the switching device 124. Such a coil can include or correspond to one of the coil(s) 114A-114C of the coil circuit 112 previously described. In one example, the actuator 128 is configured to generate, via the actuator coil, an output (e.g., a force) and/or applies the output to the switching device 124, thereby changing the position of the switching device 124 (e.g., from a closed position to an open position) to terminate an electric current flowing through or across the switching device 124.

Additionally, in some examples, the switchgear 120 includes a frame 129 supporting the switch module(s) 122A-122C. In the illustrated example of FIG. 1C, the switch module(s) 122A-122C are fixedly coupled to the frame 129, for example, via one or more fasteners and/or fastening methods or techniques. Further, in such examples, the frame 129 can be provided with a first bracket (e.g., a pole mounting bracket) affixed thereto, which can facilitate mounting and/or securing the switchgear 120 at an elevated position. In such examples, the first bracket is configured to couple to a structure (e.g., a pole) capable of supporting the weight of the switchgear 120 such as, for example, a wood pole, a steel pole, a composite pole, etc. While FIG. 1C depicts particular aspects of the switchgear 120 in connection certain with frame structures and mounting applications, it should be noted that the frame 129, the first bracket, and/or, more generally, the switchgear 120 of FIG. 1C can be configured differently for use in different applications (e.g., padmount applications and/or vault applications).

While FIG. 1C depicts certain aspects in connection with actuator-driven switchgear, it should be understood that the switchgear 120 of the system 100 may be implemented differently. For example, the switchgear 120 may be structured such that one or more (e.g., all) of the module(s) 122A-122C is/are substantially mechanically driven. In such instances, with respect to the single switch module 122A, the actuator 128 includes a solenoid (e.g., a manual reset latching solenoid) configured to operate or trigger a driving mechanism (not shown) of the switchgear 120 operatively coupled between the solenoid and the switching device 124. Such a solenoid has a single polarity and can be activated via a relatively low energy input (compared to a single coil magnetic actuator) which, in turn, causes the driving mechanism to change the position of the switching device 124 via the stored mechanical energy. The driving mechanism may include, for example, a spring-driven mechanical mechanism having one or more spring elements configured to store spring energy and, in response to the actuator 128 engaging a certain lever or trigger portion of the driving mechanism, apply the spring energy to the switching device 124 (e.g., directly or via the intermediate linkage(s)) to change the switching device position.

Figure 1D:
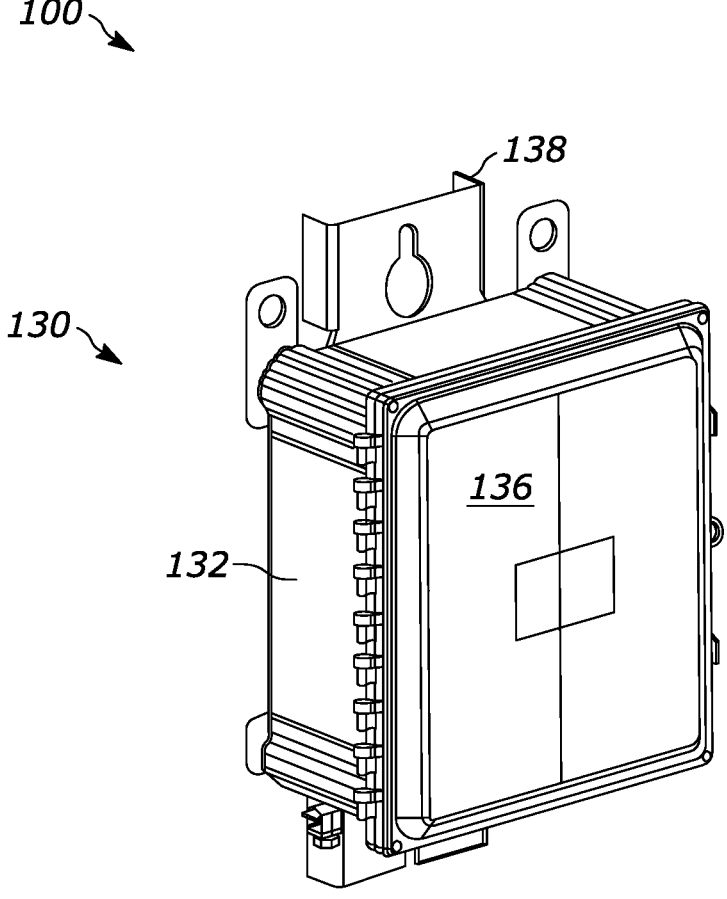
FIG. 1D is an example enclosure of the switchgear system of FIG. 1B in accordance with some aspects.
Figure 1E:
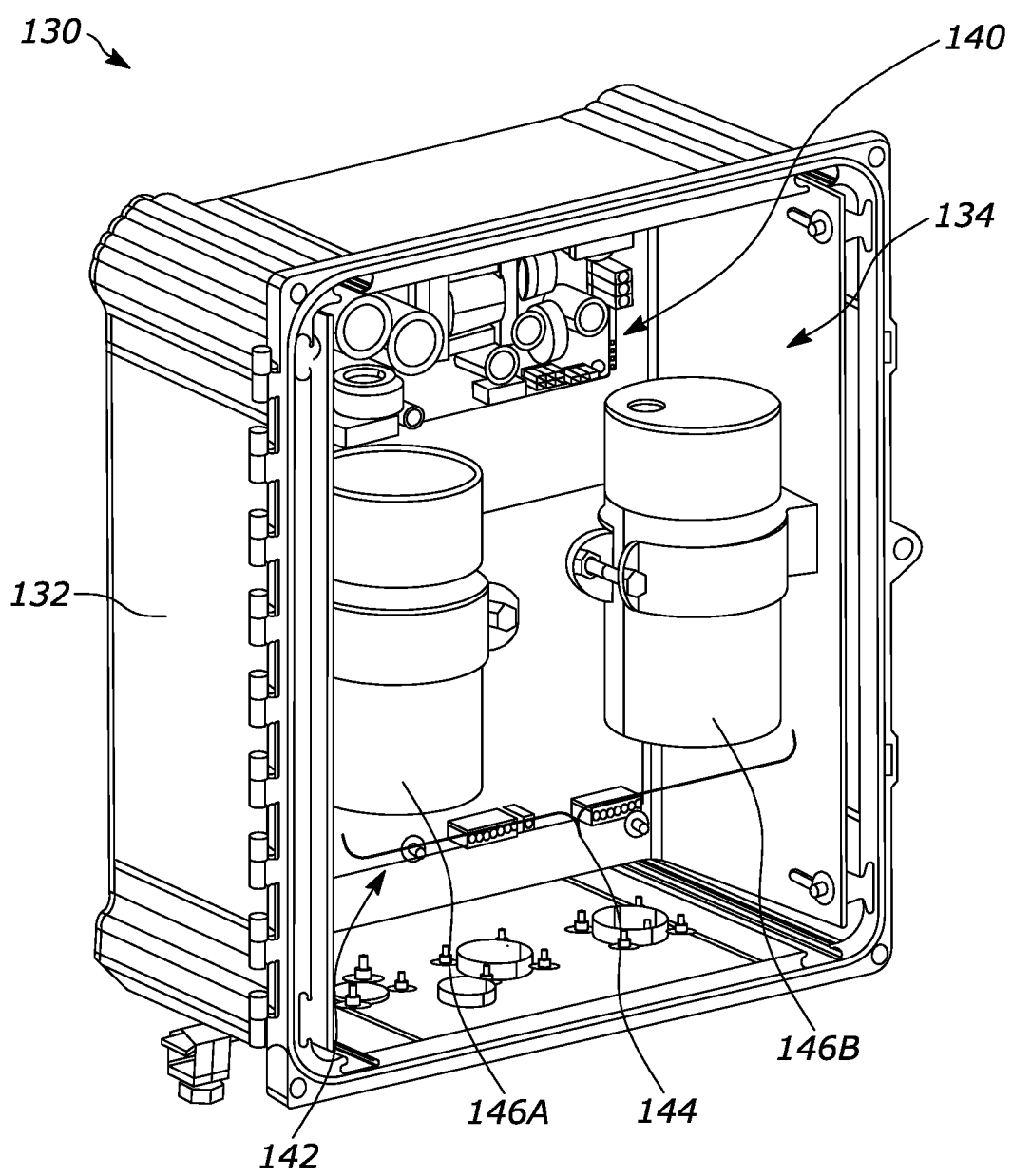
FIG. 1E is another view of the enclosure of FIG. 1D in accordance with some aspects.

FIGS. 1D and 1E are views of an example enclosure (e.g., a junction box) 130 for the system 100 of FIG. 1B in accordance with some aspects. The enclosure 130 can be advantageously utilized to house at least some electronics associated with the switchgear 120 and, in particular, create a substantially isolated environment in which the electronics can safely function.

The enclosure 130 includes a body 132 forming a cavity 134 (shown in FIG. 1E) in which the electronics are disposed. The enclosure 130 can be provided with a cover portion 136 (shown in FIG. 1D) positioned on the body 132 to cover an opening of the cavity 134. The body 132 and the cover portion 136, together, surround the internal electronics to create a physical barrier substantially blocking external elements or matter from entering the cavity 134 and/or interfering with the electronics. The cover portion 136 includes, for example, a plate, a door, and the like, or a combination thereof. In some examples, the cover portion 136 is pivotably coupled to the body 132 to allow for user access to the internal electronics, for example, via one or more hinges interposed between the body 132 and the cover portion 136. Alternatively, in some examples, the cover portion 136 is removably coupled to body 132, for example, via one or more removable fasteners and/or one or fastening methods or techniques.

In some examples, during switchgear installation, the enclosure 130 mounts to a structure in proximity to the switchgear 120, which allows for personnel to electrically connect the internal electronics to the switch module(s) 122A-122C (e.g., via wire routing). For example, the enclosure 130 can be configured to couple to part of the frame 129. Alternatively, the enclosure 130 can be configured to couple to a different structure (e.g., a wall, a pole, pedestal, etc.) such that the enclosure 130 is positioned at a relatively short distance (e.g., 10 ft., 25 ft., 50 ft., etc.) from the switchgear 120. In some examples, the enclosure 130 and the switchgear 120 are positioned on the same structure. In any case, the enclosure 130 can be provided with a second bracket (e.g., one of a frame-mounting bracket, a wall-mounting bracket, a pole-mounting bracket, etc.) 138 supporting the body 132 that is configured to affix the enclosure 130 to the structure, which is different from the first bracket of the switchgear 120 previously described.

Turning in detail to FIG. 1E, the cover portion 136 has been removed from the enclosure 130 to show electronics and related components of interest therein. According to the illustrated example of FIG. 1E, the enclosure 130 is provided with a first circuit board 140, a second circuit board 142, and a capacitor bank 144, each of which is disposed in the cavity 134 and coupled to the enclosure body 132, for example, via one or more fasteners and/or fastening methods or techniques. In particular, one or more (e.g., all) of the first circuit board 140, the second circuit board 142, and/or the capacitor bank 144 can be used to implement the back-up trip circuit 104 or at least part thereof.

In some examples, the first circuit board 140 and the capacitor bank 144, together, form the second energy management system 111 and/or perform at least some or all functions thereof. For example, the first circuit board 140 includes a power supply circuit, and the capacitor bank 144 includes one or more capacitors configured to store electrical energy supplied by the power supply circuit. As shown in FIG. 1E, the capacitor bank 144 is provided with a first capacitor 146A and a second capacitor 146B that, together, are configured to store the electrical energy for switchgear operation. Further, the second circuit board 142 includes switchgear control circuitry that can be configured to operate the module(s) 122A-122C of the switchgear 120 using electrical energy supplied by the first circuit board 140 and/or stored in the capacitor bank 144.

Figures 2, 3:
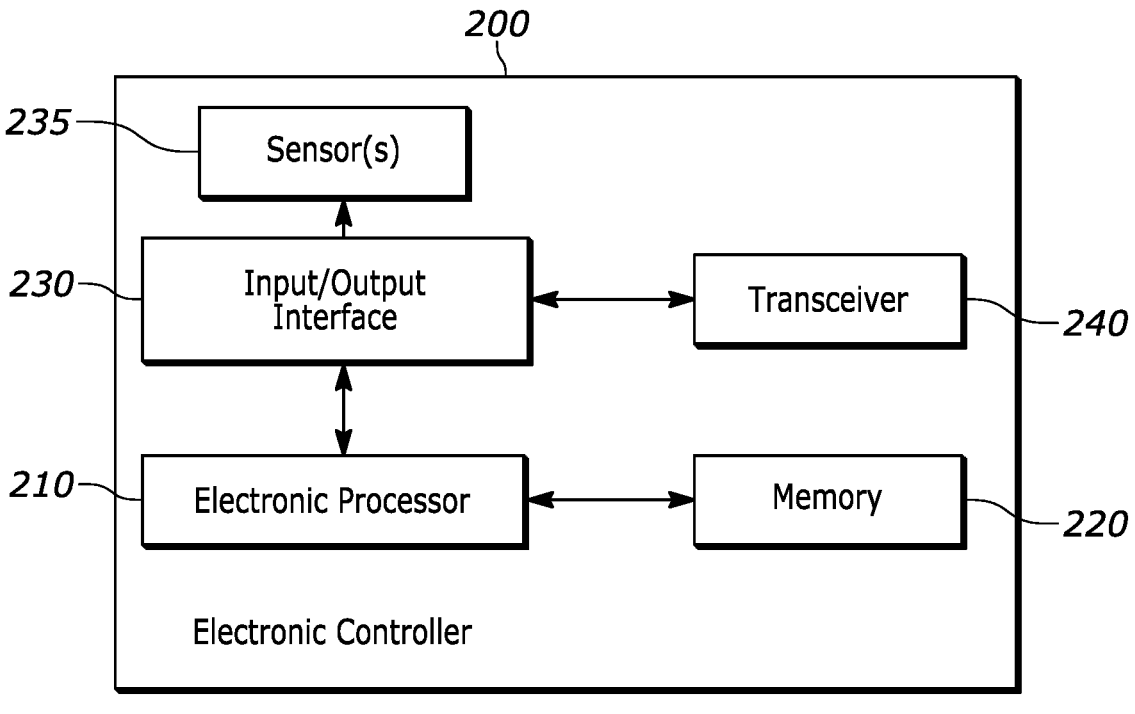
FIG. 2 is a block diagram illustrating an electronic controller used in the system of FIG. 1B in accordance with some aspects.
FIG. 3 is a block diagram illustrating another electronic controller used in the system of FIG. 1B in accordance with some aspects.

FIG. 2 schematically illustrates one example of the electronic controller 200 of the back-up trip circuit 104. In the example illustrated, the electronic controller 200 includes an electronic processor 210, a memory 220, and an input/output interface 230. The electronic processor 210, the memory 220, and the input/output interface 230 communicate over one or more control and/or data buses. FIG. 2 illustrates only one example of an electronic controller 200. The electronic controller 200 may include more or fewer components and may perform functions other than those explicitly described herein.

In some instances, the electronic processor 210 is implemented as a microprocessor with separate memory, such as the memory 220. In other instances, the electronic processor 210 may be implemented as a microcontroller (with memory 220 on the same chip). In other instances, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the system 100 described herein. The memory 220 may include, for example, a program storage area and a data storage area. The program storage area and the data storage area may include combinations of different types of memory, such as read-only memory and random-access memory.

The input/output interface 230 may be connected to one or more input mechanisms (for example, a touch screen, a keypad, a button, a knob, a microphone, sensors, and the like), one or more output mechanisms (for example, a display, one or more light-emitting diodes (LEDs), a speaker, etc.), or some combination thereof. The input/output interface 230 may also include one or more sensors (for example, sensors 235). The sensors 235 include one or more voltage sensors and/or current sensors positioned (e.g., on the switchgear 120 and/or switch module(s) 122A-122C) to monitor the one or more phases of the interconnection upstream and/or downstream and, in some embodiments, a power input to the switchgear relay circuit 102 and/or a power input to the back-up trip circuit 104.

The input/output interface 230 receives input or signals from input devices, for example, actuated by a user, and provides output or signals to output devices. For example, as explained in more detail below, the electronic controller 200 is configured to operate the changeover device 108 and/or the polarity control device 110 based on one or more inputs indicating a LOP to or a hardware or software failure of the switchgear relay circuit 102 (either directly from a sensor, a monitoring circuit, the electronic controller 106, and/or a separate electronic communications device). In some instances, as an alternative or in addition to managing inputs and outputs through the input/output interface 230, the electronic controller 200 may receive input, provide output, or both by communicating with an external device, such as an electronic communications device, over a wired or wireless connection.

In some embodiments, the electronic controller 200 includes a transceiver 240. The transceiver 240 enables wireless communication from the controller 200 to, for example, the electronic controller 106 and/or other devices of the system 100. In other instances, rather than the transceiver 240, the electronic controller 200 may include separate transmitting and receiving components, for example, a transmitter, and a receiver. In yet other instances, the electronic controller 200 may not include a transceiver 240 and may communicate with the components of the system 100 (for example, the electronic controller 106, via a wired connection.

The electronic controller 200 is configured to receive power from an energy management system. In some embodiments, the electronic controller 200 receives power from the first energy management system 107 of the switchgear relay circuit 102. In such embodiments, the electronic controller 200 further includes a back-up energy storage unit (for example, a battery, one or more capacitors, etc.), which is not shown, for use in instances where there is a LOP (as described below). Alternatively or additionally, the electronic controller 200, in some embodiments, receives power from the second energy management system 111 of the back-up trip circuit 104.

FIG. 3 schematically illustrates one example of the electronic controller 106 of the switchgear relay circuit 102. In the example illustrated, the electronic controller 106 includes an electronic processor 310, a memory 320, and an input/output interface 330. The electronic processor 310, the memory 320, and the input/output interface 330 communicate over one or more control and/or data buses. FIG. 3 illustrates only one example of an electronic controller 106. The electronic controller 106 may include more or fewer components and may perform functions other than those explicitly described herein.

The electronic processor 310, a memory 320, and an input/output interface 330 including one or more sensors 335 and, in some embodiments, a transceiver 340 of the first electronic controller 106 are similar to the electronic processor 210, the memory 220, the input/output interface 230, and the transceiver 240 of the second electronic controller 200 and, thus, for sake of brevity, are not discussed in detail herein. The sensors 335 of the first electronic controller 106 comprise one or more voltage and/or current sensors configured to measure one or more characteristics of the electrical connection(s) between the electrical grid source 15 and the client source 20. The electronic processor 310, in particular, utilizes the information from the sensors 335 to detect whether a fault has occurred within the system 100 and/or has been cleared.

Returning to FIG. 1B, during normal operation, the switchgear relay circuit 102 is configured to monitor for a fault relative to (e.g., upstream or downstream from) the switchgear system 100. In response to such a detected condition, the switchgear relay circuit 102 (in particular, the electronic controller 106 thereof) activates the trip circuit 105 (for example, each of the h-bridges 118A-118C) to flip the polarity of each of the respective actuator coils 114A-114C of the coil circuit 112. This polarity adjustment of the coil circuit 112 opens the interconnection between the electrical grid source 15 and the client source 20, effectively "tripping" the system 100 and disconnecting the client source 20 or the energy resource(s) 25 from the electrical grid source 15.

As mentioned above, failure to isolate a fault within the electrical distribution system may cause damage, for example, further upstream the system 10. Thus, in instances where the switchgear relay circuit 102 fails to open/trip, it is beneficial to have the secondary trip circuit 104 to perform the trip.

Figure 4:
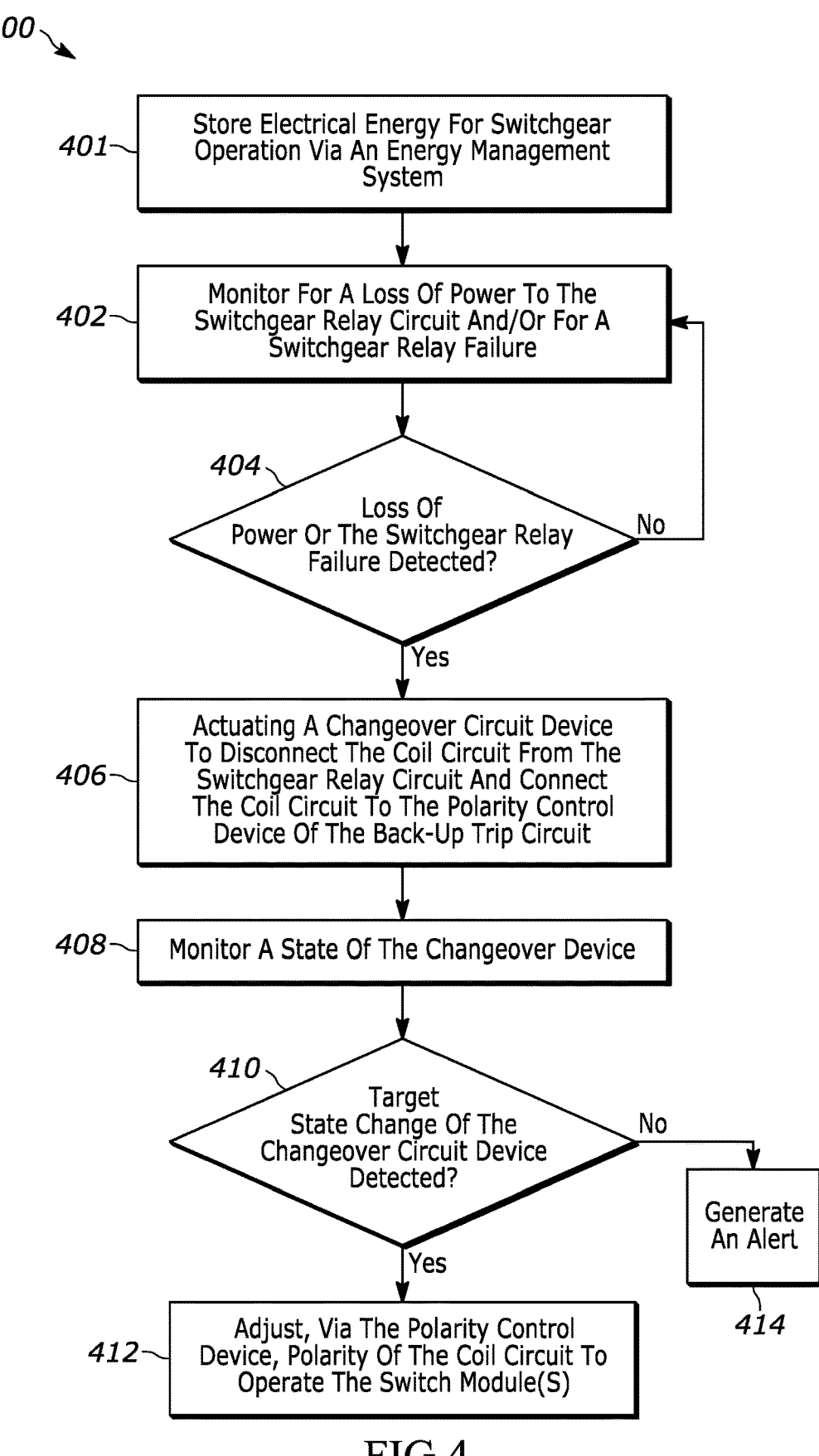
FIG. 4 is a flowchart illustrating a method for operating a back-up circuit of the system of FIG. 2 in accordance with some aspects.

FIG. 4 illustrates an example method 400 for operating the back-up trip circuit 104 of the switchgear system 100 for the electrical power distribution system 10 in accordance with some examples. Although the method 400 is described in conjunction with the system 100, the method 400 could be used with other systems and devices. In addition, the method 400 may be modified or performed differently than the specific example provided.

As noted, the method 400 is described as being performed by the electronic controller 200 and, in particular, the electronic processor 210. However, it should be understood that in some instances, portions of the method 400 may be performed by other devices. For example, additional electronic processors, such as the electronic processor 310, may be included in the system 100 that perform all or a portion of the method 400. For ease of description, the method 400 is described in terms of a single switchgear relay circuit (for example, the switchgear relay circuit 102). However, the method 400 may be applied to multiple switchgear relay circuits (for example, simultaneously).

At block 401, the electronic processor 210 controls an energy management system to store electrical energy for switchgear operation. In some examples, the electronic processor 210 directs the first energy management system 107, the second energy management system 111, or combination thereof to store electrical energy in one or more energy storage devices (e.g., the capacitor bank 144) of the switchgear system 100.

At block 402, the electronic processor 210 monitors for a loss of power to the switchgear relay circuit 102 (for example, according to readings from the sensor(s) 235). In one example, the electronic processor 210 detects when a parameter of an electric current (e.g., a DC current) transmitted from the switchgear relay circuit 102 to the back-up trip circuit 104 drops below a target threshold (e.g., preprogrammed in the electronic controller 200) indicative of normal operation. The target threshold can be a value corresponding to an output parameter (e.g., one of voltage, amperage, etc.) of the first energy management system 107 such as, for example, 12 VDC or less. Additionally or alternatively, at block 402, the electronic processor 210 monitors for a switchgear relay failure associated with the switchgear relay circuit 102. For example, the electronic processor 210 receives a certain command (e.g., a trip command) generated by the switchgear relay circuit 102 indicative of the failure.

At block 404, the electronic processor 210 determines whether a LOP, a switchgear relay failure, or a similar event of interest has occurred in connection with the switchgear relay circuit 102. As mentioned above, to provide such a determination, the electronic processor 210 utilizes one or more of the sensors 235, information and/or a trip command from the electronic controller 106, and/or, in some embodiments, according to a trip command received from another remote electronic communications device (for example, a management server of the electric power distribution system 10).

The processor 210 returns to block 402 upon determining none of a LOP, a switchgear relay failure, or a similar event of interest has occurred. In instances where at least one of a LOP, a switchgear relay failure, or a similar event of interest has occurred, at block 406, the electronic processor 210 actuates the changeover device 108 to disconnect the coil circuit 112 from the switchgear relay circuit 102 and connect the coil circuit 112 to the polarity control device 110 of the back-up trip circuit 104. That is, at block 406, the electronic processor 210 controls the changeover device 108 and/or, more generally, controls the back-up trip circuit 104 to change state (e.g., from the first circuit state to the second circuit state) to provide the second electrical connection and terminate the first electrical connection previously described. In this manner, the electronic processor 210 attempts to transfer control of the coil circuit 112 from main trip circuit 105 to the back-up trip circuit 104.

At block 408, the electronic processor 210 monitors a state of the changeover device 108. In some examples, the electronic processor 210 initiates the monitoring simultaneously or in parallel with the operation(s) performed in connection with block 406 or, in other examples, prior or subsequent to such operation(s).

At block 410, the electronic processor 210 determines whether a target state change of the changeover device 108 occurred in connection with the attempt performed at block 406. For example, the electronic processor 210 detects that the changeover device 108 changed from the first circuit state to the second circuit state. In another example, the electronic processor 210 detects that the changeover device 108 remained in the first circuit state.

In instances where the changeover device 108 successfully changes state (sometimes referred to as "throwing over"), at block 412, the electronic processor 210 controls, via the polarity control device 110, the polarity of the coil circuit 112 to operate one or more (e.g., all) switch module(s) 122A-122C of the switchgear 120. In some examples, the electronic processor 210 actuates the h-bridge(s) 116A-116C of the polarity control device 110 such that, when the coil circuit 112 is connected to the polarity control device 110, the polarity of the coil(s) 114A-114C is adjusted or changed (e.g., reversed and/or pulsed) upon connection to the respective h-bridge 116A-116C, opening the interconnection and disconnecting the client source 20 or the resource(s) 25 from the electrical grid source 15. In some scenarios where the system 100 is a multi-phase system, the electronic processor 210 adjusts, via all of the h-bridges 116A-116C, polarities of the respective actuator coils 114A-114C at substantially the same time (i.e., simultaneously).

In some instances (e.g., where the switchgear 120 is substantially mechanically driven), at block 412, the electronic processor 210 directs the polarity control device 110 to apply a low energy electrical input (e.g., 1 joule or less) to the coil(s) 114A-114C while maintaining the circuit polarity. As a result, in such instances the actuator 128 triggers the respective mechanism of the switchgear 120 to release the stored mechanical energy, opening the interconnection and disconnecting the client source 20 or the resource(s) 25 from the electrical grid source 15.

When controlling polarity at block 412, the electronic processor 210 advantageously utilizes electrical power stored by one of the first energy management system 107, the second energy management system 111, or a combination thereof. In some examples, the electronic processor 210 draws electrical power from the capacitor bank 144 in order to drive operation of the switch module(s) 122A-122C.

In some embodiments, the electronic processor 210 is further configured to output an alert to a user to notify a user that the back-up trip circuit 104 has tripped. The electronic processor 210, for example, may transmit, via the transceiver 240, a notification to a user device and/or management server to indicate that the back-up trip circuit 104 was actuated. As another example, the electronic processor 210 may provide a visual indication (for example, via one or more LEDs) or an indication displayed on a display of the back-up trip circuit 104, flipping an indication switch on a housing (not shown) of the switchgear system 100.

In some examples, following either of a time delay (for example, approximately 30 milliseconds) or determining that the switchgear relay circuit failure or LOP is cleared (for example, based on information from the sensors 245, the electronic controller 106, and/or a command from another electronic communications device), the electronic processor 210 may actuate the h-bridges 116A-116C to revert the polarity of the coils 114A-114C back and actuate the changeover device 108 to reconnect the coil circuit 112 to the switchgear relay circuit 102. The electronic processor 210 may maintain the connection between the polarity control device 110 and the coil circuit 112 via the changeover device 108 until the switchgear relay circuit failure or LOP is cleared. Alternatively, in some embodiments, the electronic processor 210 keeps the coils 114A-114C open following block 412 and does not attempt to reclose.

On the other hand, in instances where the changeover device 108 remains in the first circuit state (e.g., due to circuitry malfunction) after one or more state change attempts is/are performed, at block 414, the electronic processor 210 generates an alert (e.g., indicative of malfunction). For example, the electronic processor 210 provides a visual indication (e.g., via one or more LEDs) to warn personnel nearby the switchgear 120. Additionally or alternatively, in another example, the electronic processor 210 transmits, via the transceiver 240, a notification to a user device and/or management server to indicate a condition of the back-up trip circuit 104.

Based on the provided description, a person of ordinary skill in the pertinent art will readily understand how to make various modifications and changes without any undue experimentation and without departing from the scope of the invention as set forth in the claims below. Accordingly, the specification and figures are to be regarded in an illustrative rather than a restrictive sense, and all such modifications are intended to be included within the scope of present teachings. Furthermore, all examples recited herein are principally intended expressly to be only for pedagogical purposes to aid the reader in understanding the principles of the disclosure and the concepts contributed by the inventor(s) to furthering the art and are to be construed as being without limitation to such specifically recited examples and conditions. Moreover, all statements herein reciting principles, aspects, features, examples, and embodiments of the disclosure, as well as specific examples thereof, are intended to encompass equivalents thereof.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately,"

"about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A switchgear system comprising:
a switch module including a switching device therein;
a coil circuit operatively coupled to the switch module to control a position of the switching device;
a switchgear relay circuit including a primary trip circuit; and a back-up trip circuit including a polarity control device, a changeover device, and an electronic processor configured to:
monitor for a loss of power to the switchgear relay circuit or for a switchgear relay failure, and
in response to detecting either of the loss of power or the switchgear relay failure, operate the switch module by actuating the changeover device to disconnect the coil circuit from the switchgear relay circuit and connect the coil circuit to the polarity control device of the back-up trip circuit.

2. The switchgear system of claim 1, wherein the coil circuit includes a plurality of magnetic actuator coils, each of the plurality magnetic actuator coils being associated with a different respective phase of the switchgear system.

3. The switchgear system of claim 2, wherein the polarity control device includes a plurality of h-bridges, each of the plurality of h-bridges corresponding to a respective magnetic actuator coil of the plurality of magnetic actuator coils, and wherein the electronic processor is configured to adjust, via the plurality of h-bridges, polarities of the respective magnetic actuator coils simultaneously.

4. The switchgear system of claim 1, wherein the back-up trip circuit is interposed between the switchgear relay circuit and the coil circuit.

5. The switchgear system of claim 1, wherein the back-up trip circuit receives power from an energy management system of the switchgear relay circuit.

6. The switchgear system of claim 1, wherein the back-up trip circuit receives power from a second energy management system separate from a first energy management system of the switchgear relay circuit.

7. The switchgear system of claim 6, the system further including an enclosure in which at least one of the back-up trip circuit or the second energy management system is disposed, the enclosure configured to affix to a structure in proximity to the switch module.

8. The switchgear system of claim 1, wherein the back-up trip circuit is further configured to actuate the changeover device in response to receiving a trip command from the switchgear relay circuit.

9. The switchgear system of claim 1, wherein the switchgear system forms at least part of a distributed energy resource system including one or more energy resources electrically connected to the switch module.

10. A back-up trip circuit for a switchgear relay circuit of a switchgear system, the back-up trip circuit comprising:
a polarity control device;
a changeover device; and
an electronic processor configured to:
monitor for a loss of power to the switchgear relay circuit or for a switchgear relay failure, wherein the switchgear relay circuit includes a primary trip circuit, and
in response to detecting either of the loss of power or the switchgear relay failure, operate a switch module by actuating the changeover device to disconnect a coil circuit operatively coupled to the switch module to control a position of a switching device therein from the switchgear relay circuit and connect the coil circuit to the polarity control device of the back-up trip circuit.

11. The back-up trip circuit of claim 10, wherein the coil circuit includes a plurality of magnetic actuator coils, each of the magnetic actuator coils being associated with a different respective phase of the switchgear system.

12. The back-up trip circuit of claim 11, wherein the polarity control device includes a plurality of h-bridges, each of the plurality of h-bridges corresponding to a respective magnetic actuator coil of the plurality of magnetic actuator coils, and wherein the electronic processor is configured to adjust, via the plurality of h-bridges, polarities of the respective magnetic actuator coils simultaneously.

13. The back-up trip circuit of claim 10, wherein the changeover device is interposed between the switchgear relay circuit and the coil circuit.

14. The back-up trip circuit of claim 10, wherein the back-up trip circuit receives power from an alternating current source external to the switchgear relay circuit.

15. The back-up trip circuit of claim 10, wherein the back-up trip circuit receives power from a second energy management system separate from a first energy management system of the switchgear relay circuit.

16. The back-up trip circuit of claim 15, wherein at least a part of the back-up trip circuit or the second energy management system is disposed within an enclosure configured to affix to a structure in proximity to the switch module.

17. The back-up trip circuit of claim 10, wherein the back-up trip circuit is further configured to actuate the changeover device in response to receiving a trip command from the switchgear relay circuit.

18. A method for operating a back-up trip circuit for a switchgear relay circuit of a switchgear system, the back-up trip circuit including a polarity control device and a change-over device, the method comprising:

monitoring for a loss of power to the switchgear relay circuit or for a switchgear relay failure, wherein the switchgear relay circuit includes a primary trip circuit, and in response to detecting either of the loss of power or the switchgear relay failure, operating a switch module by actuating the changeover device to disconnect a coil circuit operatively coupled to the switch module to control a position of a switching device therein from the switchgear relay circuit and connect the coil circuit to the polarity control device of the back-up trip circuit.

19. The method of claim 18, the method further comprising:

monitoring a state of the changeover device, and in response to detecting a target state change of the changeover device, controlling the polarity control device to adjust a polarity of the coil circuit.

20. A non-transitory, computer-readable medium, comprising commands which, when executed by a computer, cause the computer to control a back-up trip circuit for a switchgear relay circuit of a switchgear system, the back-up trip circuit including a polarity control device and a change-over device, by:

monitoring for a loss of power to the switchgear relay circuit or for a switchgear relay failure, wherein the switchgear relay circuit includes a primary trip circuit, and in response to detecting either of the loss of power or the switchgear relay failure, operating a switch module by actuating the changeover device to disconnect a coil circuit operatively coupled to the switch module to control a position of a switching device therein from the switchgear relay circuit and connect the coil circuit to the polarity control device of the back-up trip circuit.

* * * * *